United States Patent
Richardson

(10) Patent No.: US 11,642,191 B2
(45) Date of Patent: May 9, 2023

(54) DENTAL AUDIO DRILL

(71) Applicant: Jennifer Richardson, Pike Road, AL (US)

(72) Inventor: Jennifer Richardson, Pike Road, AL (US)

(*) Notice: Subject to any disclaimer, the term of this patent is extended or adjusted under 35 U.S.C. 154(b) by 0 days.

(21) Appl. No.: 16/546,195

(22) Filed: Aug. 20, 2019

(65) Prior Publication Data

US 2021/0052352 A1 Feb. 25, 2021

(51) Int. Cl.
*A61C 3/02* (2006.01)
*A61C 19/00* (2006.01)
*H04L 67/125* (2022.01)
*H04W 4/80* (2018.01)
*H04L 65/60* (2022.01)

(52) U.S. Cl.
CPC ............ *A61C 3/02* (2013.01); *A61C 19/00* (2013.01); *H04L 65/60* (2013.01); *H04L 67/125* (2013.01); *H04W 4/80* (2018.02); *A61C 2203/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0278882 | A1* | 12/2005 | Drzewiecki | A46B 15/0055 15/105 |
| 2007/0162166 | A1* | 7/2007 | Ni | G11B 27/105 |
| 2012/0229276 | A1* | 9/2012 | Ronkainen | H04M 1/72454 340/540 |
| 2013/0332853 | A1* | 12/2013 | Jha | G06Q 10/1095 715/753 |
| 2014/0068591 | A1* | 3/2014 | Harding | G06F 8/61 717/171 |
| 2015/0230899 | A1* | 8/2015 | Vetter | G05B 15/02 700/90 |
| 2015/0287403 | A1* | 10/2015 | Holzer Zaslansky | G06T 13/205 704/231 |
| 2017/0069338 | A1* | 3/2017 | Elliot | H04R 29/007 |
| 2017/0251314 | A1* | 8/2017 | Pye, Jr. | G06F 3/165 |
| 2018/0032970 | A1* | 2/2018 | Scheel | H04W 4/023 |
| 2018/0144744 | A1* | 5/2018 | Badarinath | G10L 15/22 |
| 2018/0357384 | A1* | 12/2018 | St. Louis | A61G 15/02 |
| 2019/0239969 | A1* | 8/2019 | Abu-Akeel | A61C 8/0089 |

* cited by examiner

*Primary Examiner* — Duc Nguyen
*Assistant Examiner* — Assad Mohammed
(74) *Attorney, Agent, or Firm* — Ronald D. Baker; Baker & Co. Patent Law, LLC

(57) ABSTRACT

The present invention is an improved dental drill and system of assisting patients with anxiety due to dental visits. The Audio Drill system collects data such as music and time for the purposes of receiving audio data packets from a mobile device. Mobile devices such as smart phones, tablets, Internet computers, and other hand-held mobile devices are ideal for submitting music to the proposed invention. The affiliations are determined based upon the audio date and other critical markers. The system may even be enhanced by use of features tailored by the user.

8 Claims, 4 Drawing Sheets

DENTAL AUDIO DRILL

FIELD OF INVENTION

The subject disclosure relates to a system for delivering music in a manner to ease dental patients' anxiety during a routine procedure. More particularly, the present disclosure relates to a system of transmitting music to an improved dental drill to provide a comfortable environment for patients.

BACKGROUND

Traditionally, when a person visits the dentist, they experience various emotions such as anxiety mostly due to the equipment that is typically used by a dentist. Just the mere anticipation or discussion regarding an upcoming dental visit can heighten these emotions. Dentists and other related professionals have not been able to adequately calm patients' nerves during a difficult visit because often there is simply no way to measure a person's anxiety level. There has been newer dental equipment designed to lower the noise levels of drills for instance, but studies have shown this has not done enough to suppress a person's fears. Today professionals from all industries are trying to find new ways to serve their clients in a way that will make them feel satisfied and hopefully return. The dental industry has a more difficult hurdle to overcome due to the nature of the work and the images of pain that is often associated with dental work through television.

Elderly and especially children find it a challenge to make necessary appointments to the dentist due to preconceived notions of pain and feelings of anxiety where procedures such as root canals are involved. Young children have thoughts of big dangerous equipment making horrible sounds while being operated by an evil dentist who enjoys witnessing pain. We all know this is not the case, but it is difficult to completely eliminate these notions despite our best promises that everything will be fine.

Technology has made it easy to store and transmit data for many different reasons such as playing video games or watching a movie while sitting idle. Now more than ever, consumers depend heavily upon technology such as Bluetooth to communicate with colleagues, and for entertainment. Traditionally, young adults have primarily used mobile devices for texting, downloading apps for entertainment, and locating the hottest spot for socializing. It is no secret that since the introduction of mobile devices and streaming technology the growing trend has leaned toward networking and entertainment. Other trends have been toward business professionals who use mobile devices for keeping track of changes in business news. For instance, the iPad® has been fairly popular in the business arena for older and more successful users due to its ability to employ various apps that are useful for tracking business news and keeping up with cutting edge technology.

BRIEF SUMMARY

The proposed invention will serve to help to reduce the amount of anxiety that people feel as a result of a dental procedure. Despite efforts to educate and ease tensions among the public these fears seem to remain. The current invention incorporates an improved dental drill and technology in a way that have not been previously utilized to comfort the public. The audio drill system is configured to accommodate a user's entertainment preferences by allowing the user to select a specific song or a certain genre of music prior to arriving to the dentist's office. Simply put, a patient will have the ability to select songs from their own personal collection through digital files saved on a mobile device or cloud server and transmit the files to the Audio Drill software system for listening while receiving dental treatment. By utilizing data attributable to music selection, the Audio Drill system will help provide comfort by placing critical information at the fingertips of mobile device users everywhere.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
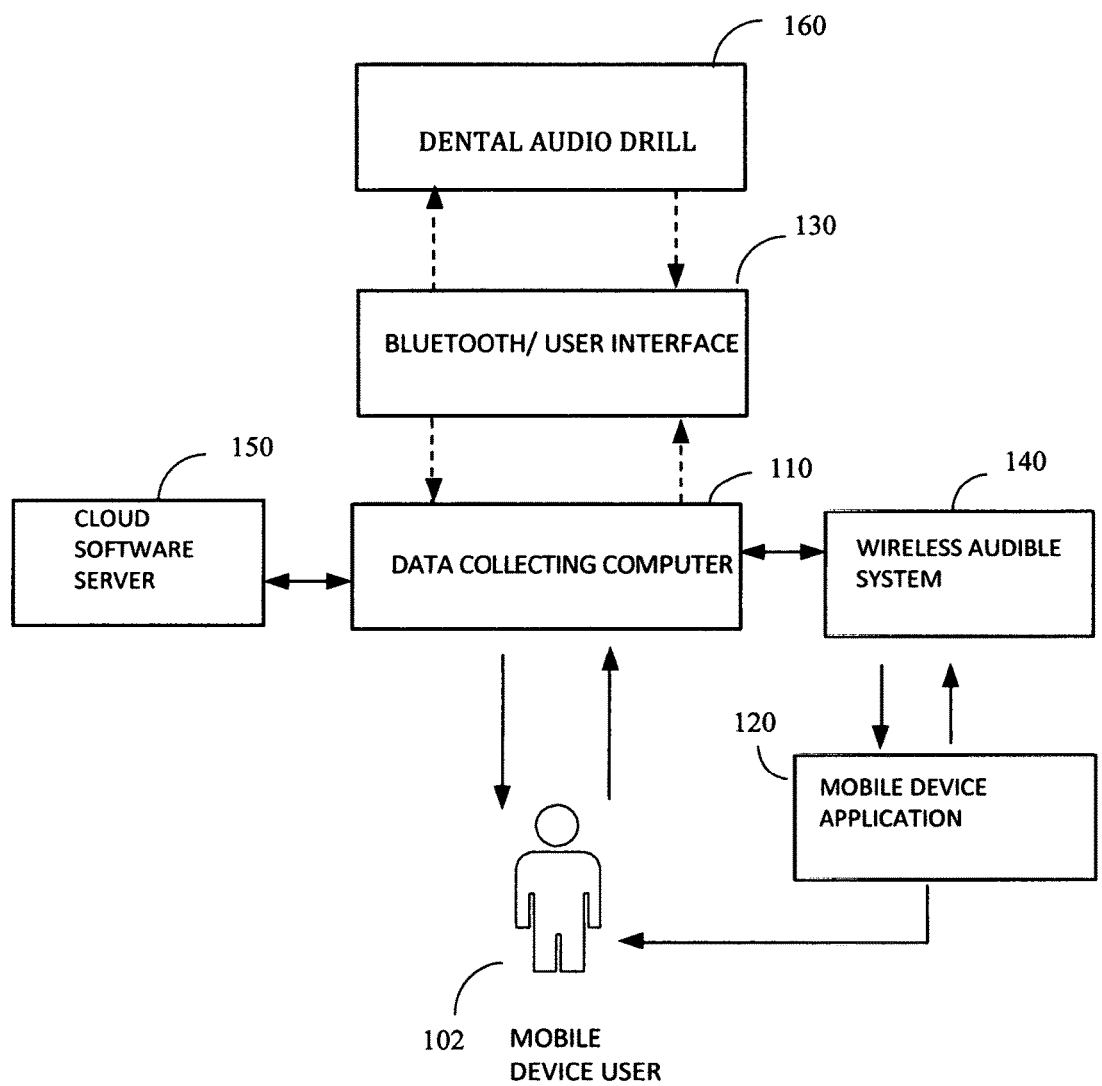
FIG. 1 is a system diagram for an exemplary system configuration consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiments" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to a mobile device refers to a variety of components that operates using any means of internet connection or similar modem that transmits packets of data that allow smart devices (such as phones, tablets, computers, handheld devices, game devices, etc.) to be updated when they receive data.

Reference throughout this document to communication system refers to a variety of components and networks that operates the Audio Drill system by using various communication devices to transmit packets of audio data that allow smart devices (such as phones, tablets, computers, handheld devices, game devices, etc.) to communicate with, the Audio Drill for proper operation of the proposed invention.

Reference throughout this document to communication device refers to a variety of devices that a user would utilize to operate the Audio Drill system (such as phones, tablets, computers, handheld devices, game devices, etc.) to communicate with the Audio Drill for proper operation of the proposed invention.

Reference throughout this document to an Audio Drill refers to an improved dental drill with a first and second end that is manufactured with a speaker and Bluetooth software capable of receiving and playing music received through data transfer.

In an embodiment, the Audio Drill application utilizes a WiFi technology or similar technology that is connected to a local mobile device such as computer, Android tablet, or iPhone etc. but is not limited to these examples. This network of devices and technology will make up the communication system of the Audio Drill. A data collecting computer will act as the system's central control unit by utilizing a processor and software to collect and integrate data for the proper operation of the overall communication system. The Audio Drill application, may be adaptable to a variety of Bluetooth devices that can be mounted in a proximate location or placed in a dental office. The coupled speaker along the housing of the improved dental drill has an electronic receiving end that is encased for a bundled communication cable that can be directly hardwired to the data collecting computer. The bundled communication cable acts as a direct method of transmitting the user's preferred audio data to the dental drill. In the event it is not convenient for the bundled communication cable to be connected to the second end of the dental drill then the attached speaker is capable of receiving audio data through Bluetooth technology as well. Additionally, using Bluetooth technology, the Audio system, may be adapted to transmit audio data to an existing surround sound system previously installed in a dental office. For instance, the Audio Drill system will include a data collecting computer that will be located in the dental office which will act as a central control unit and communication device for processing audio files selected by users. The data collecting computer will be essential for receiving data from the software server and ensuring that a patient's selected audio data is logged and transmitted to the dental drill for any upcoming appointments. The Audio Drill can receive audio transmission via Internet or software application downloaded on a user's mobile device via the data collecting computer or direct hardware connection. If the software application is downloaded to a mobile device, a user can choose the type of music in advance of the dental visit. Upon the user's arrival within a certain distance the Bluetooth enabled data collecting computer will be in constant contact with the mobile device and audio drill at all-times and will continuously transmit data by utilizing a wireless audible system; in a non-limiting example, users may initiate additional functions by manually alerting the software system installed on the mobile device through the wireless audible system. Connecting with the software application stored on an iPhone, Android tablet, or computer is a reliable method to ensure that all collected data associated to the user's mobile device. The data maybe saved to a digital storage in a cloud-based service such as Amazon web service as an example. Any mobile device that the user decides to configure will have the capability to collect and transmit while the user is within distance of the Bluetooth enabled drill. In a non-limiting example, the application installed on the mobile device may display an image of other musical selections. Information is constantly compiled, for each device through use of the software application on the desired mobile device.

In a non-limiting example, the proposed invention may incorporate the use of mobile devices to predict music preference and submit data to the Audio Drill at a point prior to the user's dental procedure. Utilizing such data, the Audio Drill system will provide a comforting experience for the user who would otherwise be a very dreadful visit. A memory cache is incorporated which will receive audio data from the application software. As an example, by utilizing an algorithm, the more data collected by the data collecting computer based on a user's previous music preferences the more confident the Audio Drill application software will be at quickly determining a user's music style. Making such determination is critical for the application system; the user's overall satisfaction depends on the accuracy of music preference. Once a patient is put at ease by the alluring sound of their own playlist then the overall experience will go a lot better for both the Dentist as well as the patient.

The Audio Drill system utilizes critical information that takes place through the interaction of the administrative assistant once the user checks in for an appointment. Usually an administrative assistant utilizes a desk computer for completing office related tasks but also the desk computer is critical once the patient arrives to the dental office for an appointment. As an alternative, the system can send a notification to the Audio Drill when the administrative assistant takes the necessary information from the patient for purposes of checking the patient in. Once the patient has been checked in by the desk computer through the asistant's acts then the system can submit data to both the data collecting computer as well as a cloud-based server to initiate the user's music at the allotted appointment time. Additionally, the Audio Drill system can also be activated via Bluetooth technology upon the user's distance within the dental office which may also initiate the system for purposes of playing a user's preferred music. In a non-limiting example, the system can also utilize an algorithm which can used to predict a user's genre of music in the event a user does not make a selection prior to a visit but can also elect through the application software not to have music played for a particular visit.

Turning now to FIG. 1, this figure presents a system diagram for an exemplary system configuration consistent with certain embodiments of the present invention. A system for communicating audio data from a user's mobile device 100 to a dental drill 160. A user may initiate the software system by utilizing the mobile device application 120. When the system is initiated, the data collecting computer 110 sends audio collected data through Bluetooth technology, containing the uses music preference to the wireless audible system 140 which transmits data to the Audio Drill application software 120. The Audio Drill software server 120 stores the transmitted information data in the data collecting computer 110 containing all of the collected audio data, either automatically by the Audio Drill system or include another acceptable manner in the known art. The transmitted audio information may be stored through one or more cloud servers 120.

Figure 2:
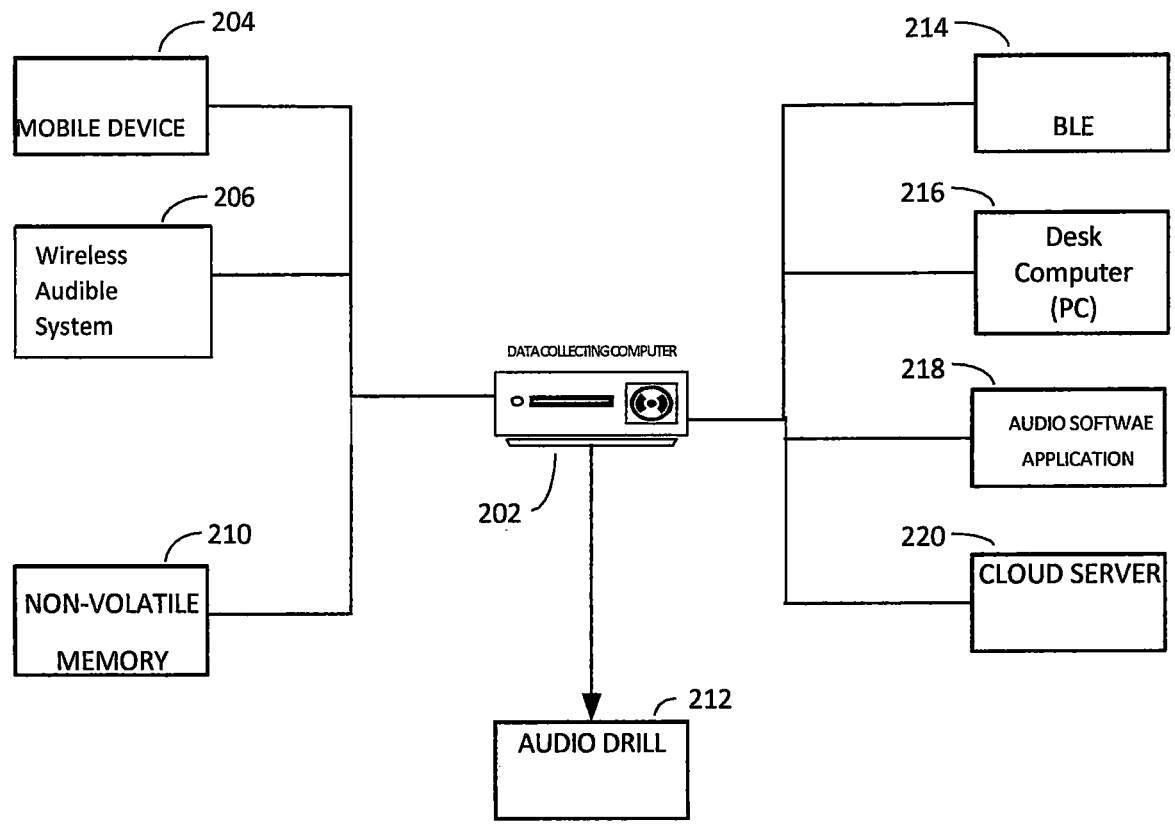
FIG. 2 is a system diagram for uploading data onto a dental device consistent with certain embodiments of the present invention.

Turning to FIG. 2, this figure presents a system diagram for an exemplary system configuration consistent with certain embodiments of the present invention. This figure presents a diagram for how a data collecting computer 202 will transmit and receive audio data between various components when the Audio Drill system is operational. The mobile device 204 captures audio data and stores memory in a cache 210 which continuously collects data from the software. The collected data is submitted to a memory cache 210 and is maintained by a server. Each mobile device 204 may have multiple applications 218 installed on the device 204 based upon a user's preferences. The installed application 218 to each mobile device 204 is connected to a digital database 225 associated with the mobile device 204 The mobile device 204 can be configured to transfer audio data via wireless audible system 206 that can be received, directly to the Audio Drill speakers.

Figure 3:
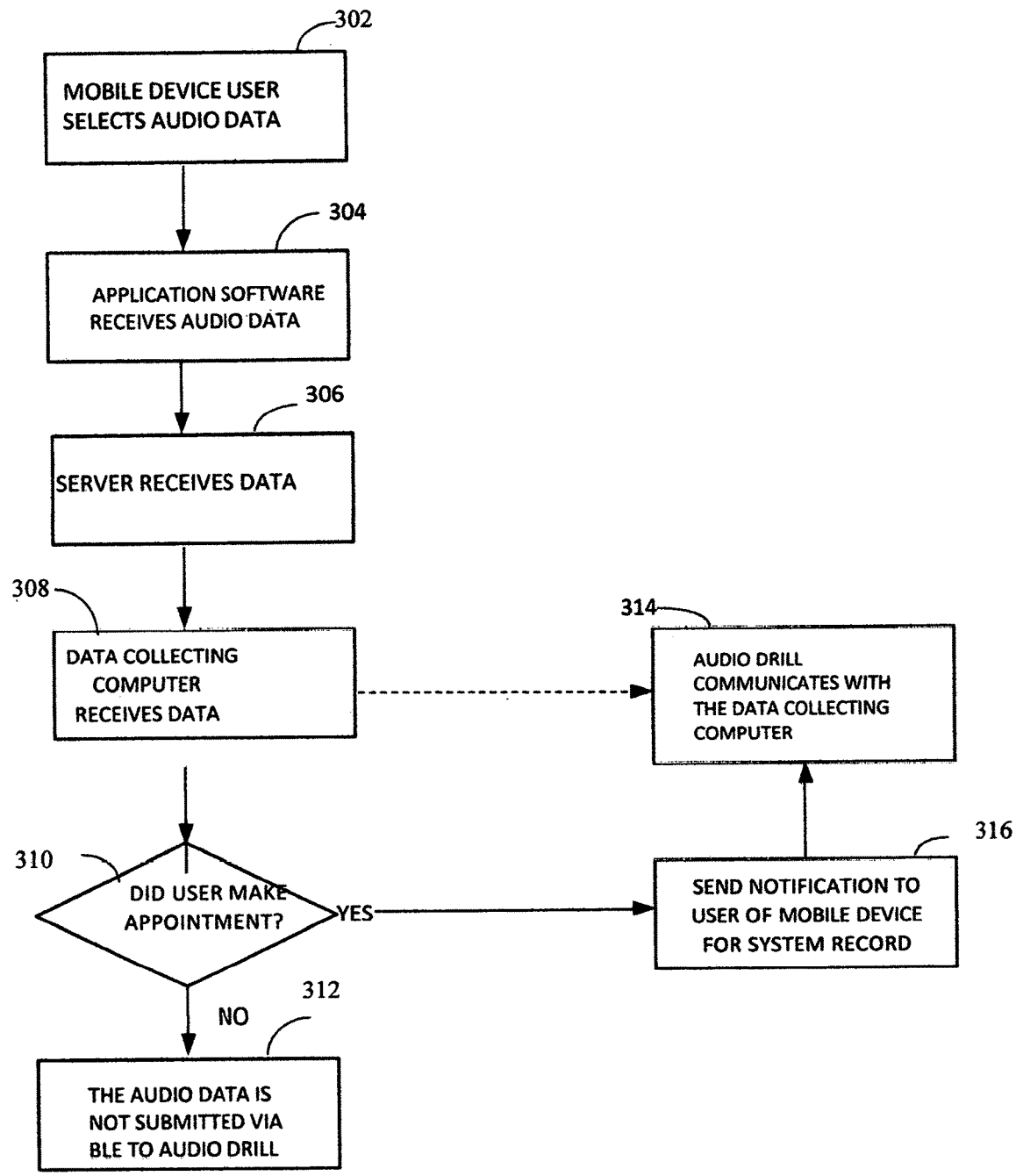
FIG. 3 is a process flow for the determination of critical data for the owner or user of a mobile device consistent with certain embodiments of the present invention.

Turning to FIG. 3, this figure presents a process flow for certain affiliations of the user of a mobile device consistent with certain embodiments of the present invention. When the Audio Drill software system is initiated by a mobile device at 300, the application on the Audio Drill will store and schedule the collected audio data within the application for an impending dental visit. In a non-limiting example, the Audio Drill software system application stored on the mobile device will keep track of all captured data.

At 302, as an alternative once the user checks into the front desk of the dental office, the administrative assistant will log into the Audio Drill application and input information that will alert the software that the user is present and the system will submit data to the Audio Drill System for purposes of allowing a patient's personal music preference to be submitted prior to a routine visit and will subsequently play the allotted music.

At 304, the Audio Drill software system has the capacity to analyze such data by utilizing all of the collected data from the data collecting computer. The application may also use algorithms known in the art to predict a person's musical selection for subsequent visits. As a non-limiting example assume a mobile device is activated and is properly operating. To illustrate, where a user has selected a certain genre of music previously for purposes of a dental visit by using the Audio Drill system the application software system will continue to utilize collected data to correctly make selections within a given period of time.

At 306, as an example, the system can also submit data to a cloud-based service such as Facebook, LinkedIn, Amazon, and other such mobile service providers, may receive data regarding collected data.

At 308, the Audio Drill system will alert a dental professional via mobile device of upcoming appointment dates as well as music selections that will be submitted to the drill for a user's pleasure.

At 310, the Audio Drill system will allow a decision to be made regarding the presence of the patient for a pre-scheduled appointment.

At 312, the Audio Drill system will not initiate audio data to the improved dental drill if the patient does not arrive for the dental appointment.

At 314, the Audio Drill system will store submitted data and time stamp in a non-volatile memory At 316, upon a user's request the Audio Drill system offers alternative means of alerting the end user by offering various options that allows for simultaneous audible and visual alerts on the mobile device.

Figure 4:
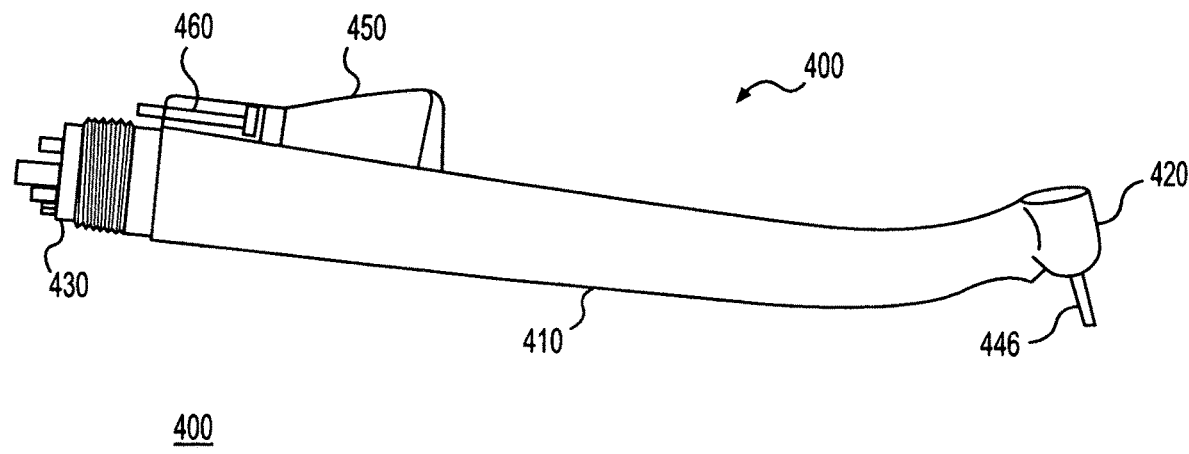
FIG. 4 is a perspective view of an improved dental drill with a speaker attached along the housing of the drill.

Turning to FIG. 4, this figure presents an exemplary view of an improved dental drill configuration consistent with certain embodiments of the present invention. This figure presents a perspective view of an improved dental drill 400 that shows what an operable Audio Drill 400 would look like. The housing 410 of the improved dental drill 400 is designed to include a speaker 450 attached to the housing 410. While the dental drill bit 440 of the first end 420 of the improved drill 400 is inserted in a patient's mouth the speaker 450 is manufactured to play the user's preferred audio during the procedure. The improved dental drill 400 has a second end 430 that is ordinarily used for electrical attachment which is adjacent to an additional electronic attachment protectively encased in a housing 460 which detachably couples to a communication cable hardwired to the data collecting computer or capable of Bluetooth technology in the event hardwiring is not convenient.

While certain illustrative embodiments have been described, it is evident that many alternatives, modifications, permutations and variations will become apparent to those skilled in the art in-light of the foregoing description.

What is claimed is:

1. A system for assisting patients using a dental audio drill comprising:
 a data collecting computer comprising a processor and software, the software when executed by the processor causes the processor to:
 detect presence of a user through Bluetooth technology when a mobile device associated with the user is at a predefined distance from a dental office;
 upon the detection of the presence of the user, receive, at the data collecting computer, audio data from the mobile devices of the user through a mobile application downloaded in the mobile device or from a server, said mobile devices or the server being operable to transmit the audio data indicative of users' preferred audio;
 upon a receipt of the audio data, transmit, from the data collecting computer, the audio data to a wireless audible system;
 transmit, through the wireless audible system, the audio data to the dental audio drill, wherein the dental audio drill comprises a speaker operable by a hardware or a wireless connection with the data collecting computer for playing the audio data during a dental procedure, wherein the processor is further configured to predict the user's audio selection based on a predefined algorithm for subsequent visits to the dental office by analyzing the audio data.

2. The improved dental drill and system according to claim 1; wherein the speaker further consists of a first end and second end.

3. The improved dental drill and system according to claim 2; wherein the second end further consists of an electronic attachment extending from the attached speaker that receives a bundled cable for communication.

4. The improved dental drill and system according to claim 1; wherein the data collecting computer acts as a central control unit for the system.

5. The improved dental drill and system according to claim 3; wherein the data collecting computer can further receive data from a user's mobile device once the device is within the office area.

6. The improved dental drill and system according to claim 1; wherein the data collecting computer further comprised of hardware components that are stationed in the dental office.

7. The improved dental drill and system according to claim 1; wherein a communication device comprises all dental devices capable of receiving data via Bluetooth technology.

8. The improved dental drill and system according to claim 1; wherein the software application can be integrated to existing applications on the user's mobile devices.

\* \* \* \* \*